United States Patent [19]
Lentz et al.

[11] Patent Number: 5,887,148
[45] Date of Patent: Mar. 23, 1999

[54] SYSTEM FOR SUPPORTING A BUFFER MEMORY WHEREIN DATA IS STORED IN MULTIPLE DATA WIDTHS BASED UPON A SWITCH INTERFACE FOR DETECTING THE DIFFERENT BUS SIZES

[75] Inventors: Derek J. Lentz, Los Gatos; Cheng-Long Tang, San Jose, both of Calif.

[73] Assignee: Seiko Epson Corporation, Tokyo-to, Japan

[21] Appl. No.: 757,252

[22] Filed: Nov. 27, 1996

Related U.S. Application Data

[63] Continuation of Ser. No. 317,839, Oct. 5, 1994, Pat. No. 5,594,877, which is a continuation of Ser. No. 853,604, Mar. 18, 1992, abandoned.

[51] Int. Cl.[6] .................................................. G06F 13/40
[52] U.S. Cl. ......................... 395/307; 395/306; 395/308
[58] Field of Search .................................. 395/306, 307, 395/325, 800, 460, 308, 309

[56] References Cited

U.S. PATENT DOCUMENTS

| | | | |
|---|---|---|---|
| 4,271,480 | 6/1981 | Vinot | 395/250 |
| 4,453,229 | 6/1984 | Schaire | 395/250 |
| 4,514,808 | 4/1985 | Murayama et al. | 395/307 |
| 4,633,437 | 12/1986 | Mothersole et al. | 395/250 |
| 4,663,728 | 5/1987 | Weatherford et al. | 711/155 |
| 4,667,305 | 5/1987 | Dill et al. | 395/307 |
| 4,716,527 | 12/1987 | Graciotti | 395/307 |
| 4,766,538 | 8/1988 | Miyoshi | 395/307 |
| 4,860,198 | 8/1989 | Takenaka | 395/307 |
| 4,878,166 | 10/1989 | Johnson et al. | 395/425 |
| 5,045,998 | 9/1991 | Begun et al. | 395/307 |
| 5,113,369 | 5/1992 | Kinoshita | 395/307 |
| 5,125,084 | 6/1992 | Begun et al. | 395/375 |
| 5,148,539 | 9/1992 | Enomoto et al. | 395/425 |
| 5,191,653 | 3/1993 | Banks et al. | 395/275 |
| 5,202,969 | 4/1993 | Sato et al. | 395/425 |
| 5,224,213 | 6/1993 | Dieffenderfer et al. | 395/250 |
| 5,235,693 | 8/1993 | Chinnaswamy et al. | 395/425 |
| 5,255,374 | 10/1993 | Aldereguia et al. | 395/293 |
| 5,255,378 | 10/1993 | Crawford et al. | 395/325 |
| 5,265,234 | 11/1993 | Ogura et al. | 395/425 |
| 5,274,780 | 12/1993 | Nakao | 395/287 |
| 5,280,598 | 1/1994 | Osaki et al. | 395/425 |
| 5,440,752 | 8/1995 | Lentz et al. | 395/303 |
| 5,611,071 | 3/1997 | Martinez, Jr. | 395/307 |
| 5,617,546 | 4/1997 | Shih et al. | 395/307 |

FOREIGN PATENT DOCUMENTS

| | | |
|---|---|---|
| 0255593 | 2/1988 | European Pat. Off. . |
| 0290172 | 11/1988 | European Pat. Off. . |
| 0468823 | 1/1992 | European Pat. Off. . |

OTHER PUBLICATIONS

Zoch et al., "68020 Dynamically Adjusts its Data Transfers to Match Peripheral Ports," *Electronic Design*, vol. 33, No. 12, May 1985, pp. 219–225.
*Patent Abstracts of Japan*, vol. 12, No. 100, (p–683) (2947), Apr. 2, 1988 & JP 62–232061, Oct. 12, 1987.
*Patent Abstracts of Japan*, vol. 13, No. 175, (P–863) (9561), Apr. 25, 1989 & JP 62–165610, Jul. 2, 1987.

*Primary Examiner*—Meng-Ai T. An
*Assistant Examiner*—Rupal D. Dharia
*Attorney, Agent, or Firm*—Sterne, Kessler, Goldstein & Fox P.L.L.C.

[57] ABSTRACT

The present invention provides a memory system interface design, which provides access to a dual width memory bus. Specifically, a subsystem and method provides for interfacing with a 32 bit or a 64 bit bus. The 32 bit bus would be used for low end products, and the 64 bit bus would be used for high end products. A memory control unit (MCU) supports both the 32 bit and 64 bit modes. Selecting a 32 bit or 64 bit memory subsystem gives a user more room to adjust system cost and performance.

17 Claims, 10 Drawing Sheets

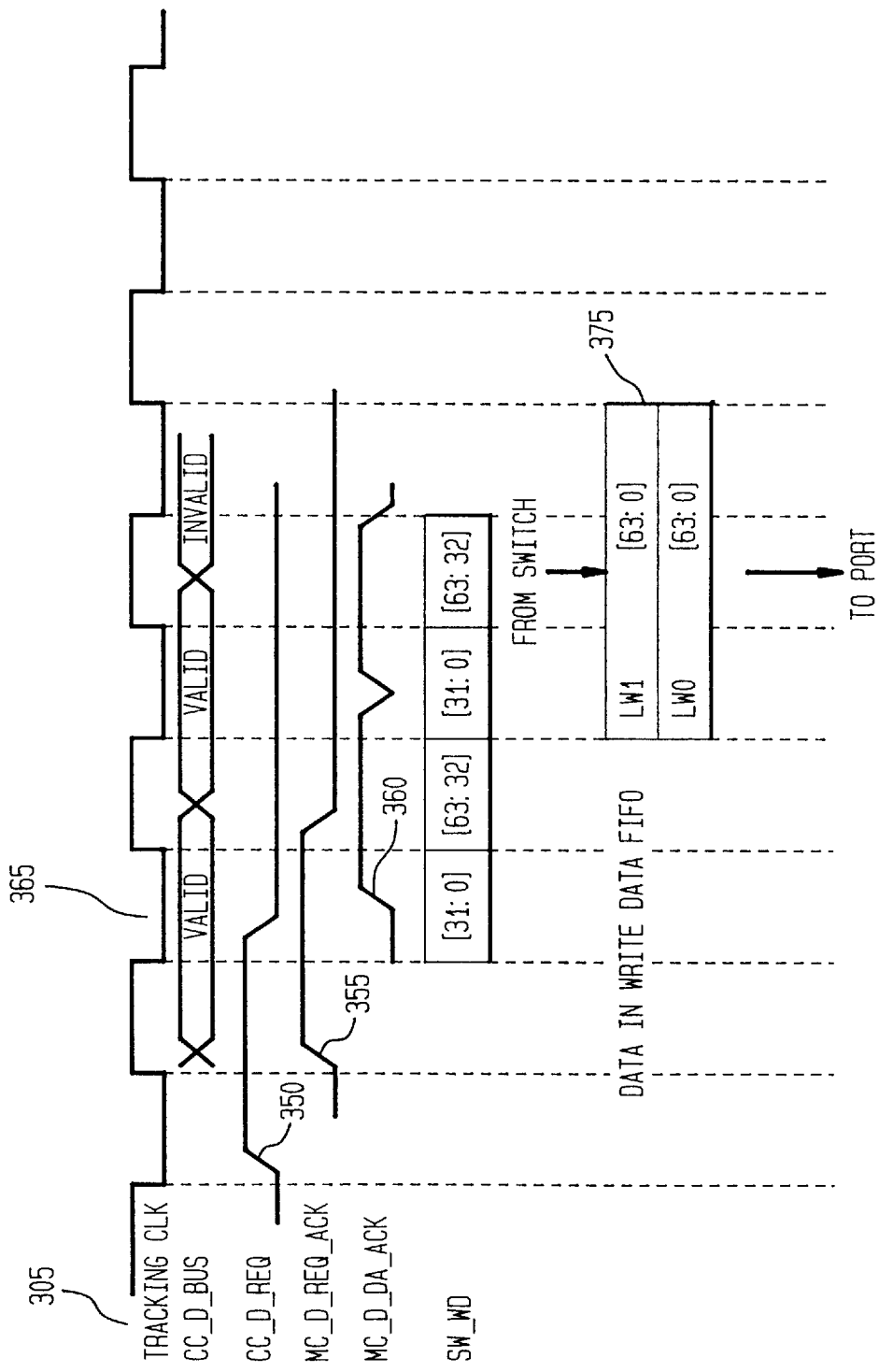

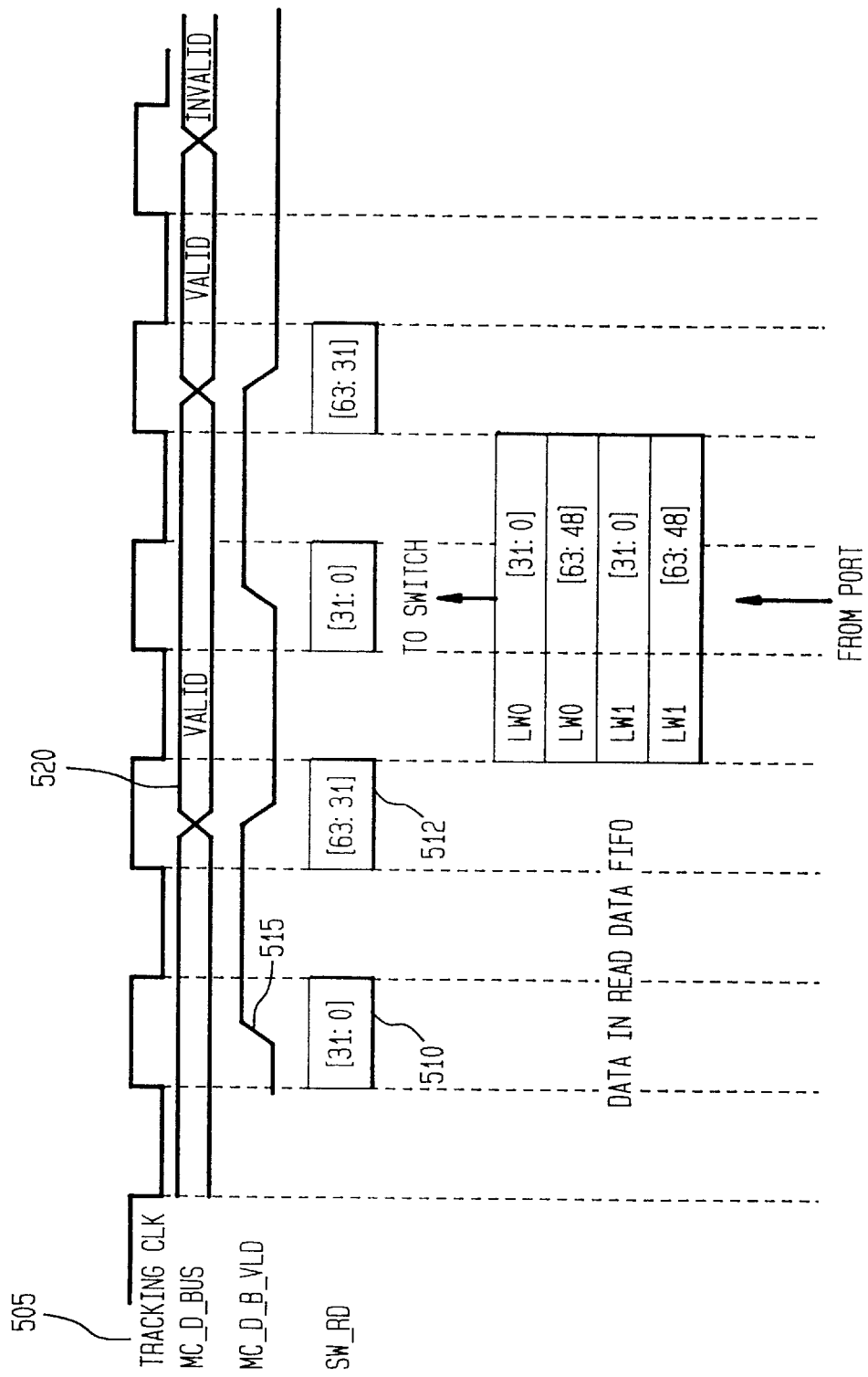

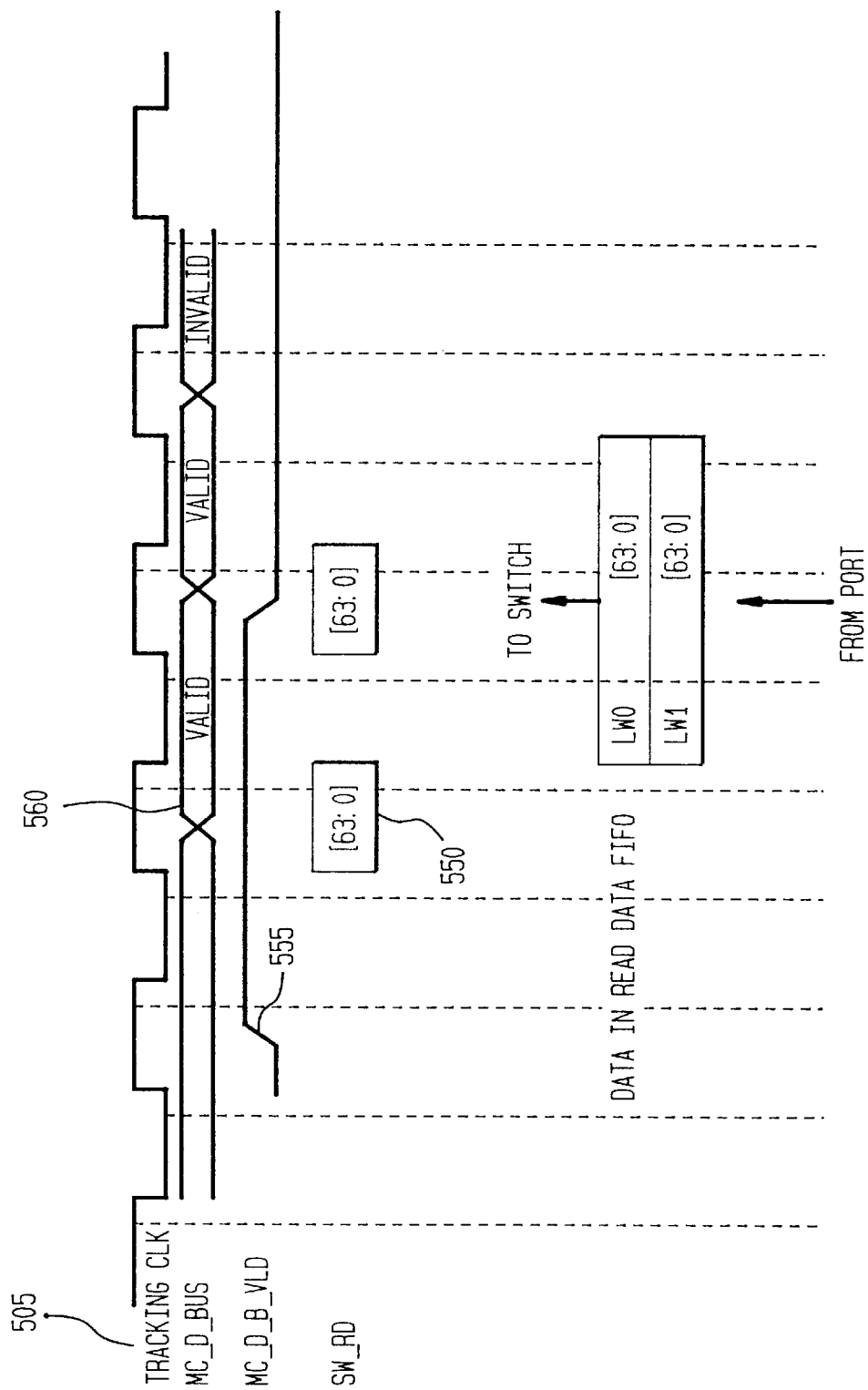

SYSTEM FOR SUPPORTING A BUFFER MEMORY WHEREIN DATA IS STORED IN MULTIPLE DATA WIDTHS BASED UPON A SWITCH INTERFACE FOR DETECTING THE DIFFERENT BUS SIZES

CROSS-REFERENCE TO RELATED APPLICATION

This application is a continuation of application Ser. No. 08/317,839, filed Oct. 5, 1994(allowed) Pat. No. 5,594,877, which is an FWC of application Ser. No. 07/853,604, filed Mar. 18, 1992 (abandoned).

This application is also a continuation-in-part of application Ser. No. 08/474,385, filed Jun. 7, 1995, which is a continuation of application Ser. No. 07/726,893, filed Jul. 8, 1991 (status: U.S. Pat. No. 5,440,752).

BACKGROUND OF THE INVENTION

1. Field of the Invention

The present invention relates generally to the field of microprocessor memory systems, and more particularly to a system that supports a dual width memory bus.

2. Discussion of Related Art

A typical computer-based processor system (or computer system) consists of three major subsystems: a main memory, one or more central processing units (CPU) and an input-output (I/O) subsystem. In a computer system, the various subsystems must have interfaces to one another. For example, the memory and CPU need to communicate, as well as the CPU and I/O devices.

This communication is typically done via a bus. The bus serves as a shared communication link between the subsystems. Two major advantages of having a bus are low cost and versatility. By defining a single interconnection scheme, new devices and subsystems can easily be added to the computer system. Moreover, peripherals may even be ported between separate computer systems that use a common bus.

One reason bus design is so difficult is that the maximum bus speed is largely limited by physical factors: the length of the bus and the number of devices (and, hence, bus loading). These physical limits prevent arbitrary bus speedup.

The objective of designing a memory subsystem is to attempt to match processor speed with the rate of information (or bandwidth) of memory at the lowest level and most reasonable cost. For main memory, we can use a wider bus called a "memory bus" to increase the memory bandwidth or to reduce the latency of memory. In the case of a memory subsystem, the memory bandwidth is the number of memory bytes that can be transferred (either fetched or stored) between the CPU and the memory per unit time. Hence, the maximum memory bus bandwidth B is equal to $B=W/Tm$ byte/s, where W is the width of word in bytes delivered per memory cycle Tm.

Oftentimes, a variety of different size memory buses are available to help increase performance. However, designing a system that allows access to multiple external buses having different widths presents a design problem. If, for example, a system that is currently configured to accept data from the memory bus in 32 bit blocks, a 64 bit data transfer will create a predicament for the CPU and/or cache. Consequently, a system is needed that allows memory buses with different widths to be utilized without changing the overall configuration of the computer system. For a more in depth discussion of the above, see Hennessy et al., *Computer Architecture a Quantitative Approach*, Morgan Kaufmann Publishers (1990).

SUMMARY OF THE INVENTION

The present invention provides a memory system interface design for a processor and a method of operating such an interface which provides access to a dual width memory bus. Specifically, the present invention provides a mechanism that allows a computer-based system to access either a 32 bit memory bus or a 64 bit memory bus. The 32 bit memory bus would be used for low-end products, while the 64 bit memory bus would be used for high-end products. A memory control unit (MCU) of the present invention supports both modes: the 32 bit bus mode and the 64 bit bus mode. The present invention in one embodiment has been integrated onto a microprocessor chip.

Selecting a 32 bit or 64 bit memory subsystem provides a user with a flexible framework in which to design a system. The user can adjust system cost and performance by choosing to utilize a 32 bit or 64 bit external bus. The present invention provides a system and method which decreases the amount of wires necessary to transfer data. Moreover, a microprocessor chip incorporating the present invention allows switching between the 32 bit or 64 bit external memory bus without changing the control signals and/or system configuration.

The present invention provides a computer-based system and method for efficiently transferring data over an external memory bus between a main memory and a bus requester, comprising a dual width memory subsystem configured to provide access to a plurality of different external memory buses. The dual width memory subsystem comprises a plurality of multiplexers connected to receive data from the bus requestor and a storage device connected to receive and store data from the plurality of multiplexers, the data is stored in blocks depending on the width of the external bus. Furthermore, the dual width memory subsystem comprises a storage device connected to receive and store data from the external memory bus, the data is stored in blocks depending on the width of the external bus. A plurality of multiplexers connected to receive data from the storage device, and connected to send said data to a bus requester in blocks determined by the limitations of the system.

BRIEF DESCRIPTION OF THE DRAWINGS

The above and further advantages of this invention may be better understood by referring to the following description taken in conjunction with the accompanying drawings, in which:

FIG. 3a and FIG. 3b are the cache write (store) data timing for a 32 bit and a 64 bit memory bus, respectively;

FIG. 5a and FIG. 5b show return read data timing for a 32 bit and a 64 bit memory bus, respectively;

DETAILED DESCRIPTION

I. Environment/Background for the Present Invention

Figure 1:
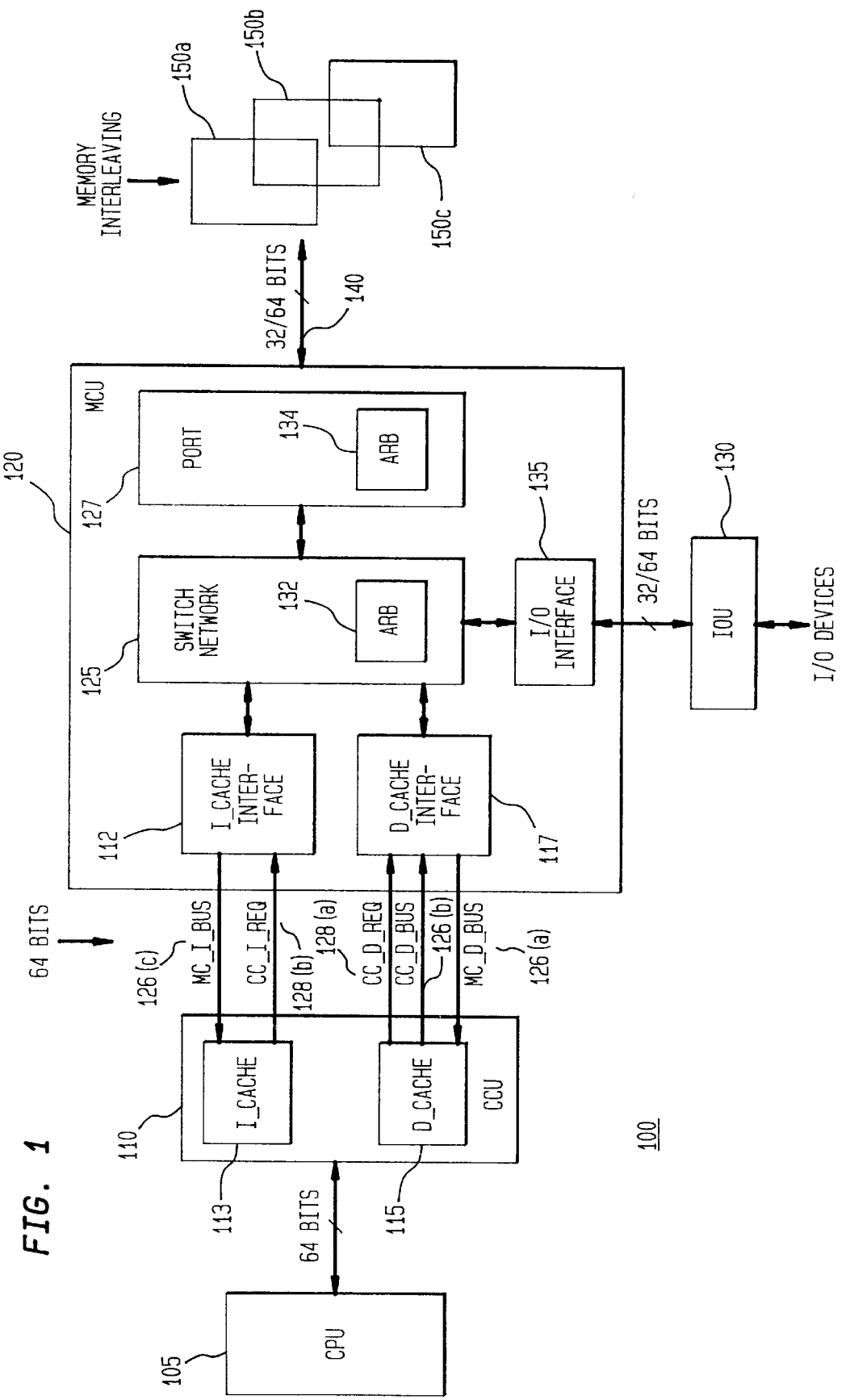
FIG. 1 is a general block diagram of the system architecture 100 of the present invention.

Referring to FIG. 1, there is provided in accordance with a preferred embodiment of the present invention a microprocessor architecture designated generally as 100. System architecture 100 includes a CPU 105, a cache controller unit 110 which includes cache memories 113 and 115, an I/O subsystem 130, a memory control and interface unit 120 (MCU), and interleaved memory banks 150a, 150b, 150c configured for interleaved operations. The interleaved memory banks 150 are connected to MCU 120 via an external data bus 140. The present invention allows MCU 120 to accept data from either a 32 bit or a 64 bit external bus 140. It is contemplated that the present invention will operate in a multiprocessor environment.

Cache memory 113, 115 serves as a buffer between CPU 105 and memory 150a, 150b, and 150c. Generally, a cache is a small, fast memory located close to CPU 105 that holds the most recently accessed code or data. Typically, CPU 150 is the fastest unit in the system, with a processor cycle typically of tens of nanoseconds, while memory 150 has a cycle time of hundreds of nanoseconds. The speed gap between CPU 105 and memory 150 can be closed by using fast cache memory 110 between the two. However, regardless of how fast CPU 105 and cache 110 are, performance will suffer if there are no means of retrieving the data in a fast, efficient manner. Consequently, connecting a wider external bus 140 to MCU 120 allows more data to be transferred. Thus, the present invention allows MCU 120 to be connected to memory buses with different data widths.

MCU 120 of a preferred embodiment of the present invention comprises a switch network 125 which includes a switch arbitration unit 132, a data cache interface circuit 117, an instruction cache interface circuit 112, an I/O interface circuit 135, and one or more memory port interface circuits 127 known as ports, each port interface circuit 127 includes a port arbitration unit 134. MCU 120 is a circuit whereby data and instructions are transferred (read or written) between cache controller unit 110 (CCU) (both D-cache 115 and I-cache 113 (read only)), IOU 130 and main memory 150.

Switch network 125 is a means of communicating between a master and slave device. To switch network 125 the possible master devices are a D_Cache 115, an I_Cache 113, or an I/O Controller Unit (IOU) 130 and the possible slave devices are a memory port 127 or an IOU 130, for example.

The function of switch network 125 is to receive the various instruction and data requests from CCU 110 and IOU 130. These units may be referred to as bus requesters. After having received these requests, the switch arbitration unit 132 passes them to the appropriate memory port (depending on the instruction address). The port 127, or ports as the case may be? will then generate the necessary timing signals, and send or receive the necessary data to/from external memory bus 140. Memory interface port 127 manages the data by sending to and receiving from interleaved memory 150. D-cache 115 requires that any data transaction be carried out in 64 bit blocks, regardless of whether the system is currently coupled to a 32 or 64 bit external memory bus 140.

Switch network 125 is connected to CCU 110, IOU 130, and memory port 127 via a set of tri-state buffered signal buses. The tri-state buffered signal buses include a memory control data bus (MC_D_BUS) 126(a), a cache data bus (CC D_BUS) 126(b), and a memory control instruction bus (MC_I_BUS) 126(c). Furthermore, the present invention includes request buses CC_D_REQ 128(a) and CC_I_REQ 128(b) and control signals (not shown) MC_D_REQ_ACK, MC_D_DA_ACK, and MC_D_B_VLD.

Generally, a bus transaction includes two parts: sending the address and receiving or sending the data. Bus transactions are usually defined by what they do to memory: a read transaction transfers data from memory (to either the CPU or an I/O device, for example), and a write transaction writes data to the memory. In a read transaction, the address is first put on the memory address bus (not shown) to memory 150, together with the appropriate control signals indicating a read. The memory responds by returning the data on bus 140 with the corresponding control signals. A write transaction requires that the CPU or I/O device send both address and data, and requires no return of data.

The present invention contemplates being placed on a chip with either a 64 pin or a 32 pin external memory bus interface. As will be appreciated, the 64 pin interface can be used in either 32 or 64 bit mode (i.e., with either a 64 bit or 32 bit external bus 140). A chip with a 32 pin memory data bus interface can not operate in 64 bit mode.

At reset, a preferred embodiment will assume a 32 bit memory interface during power up (boot), read a word from a fixed location (on or off chip) and ascertain therefrom the configuration required for proper system operation. In particular, during power up CPU 105 reads and executes boot code. The boot code instructs CPU 105 to read a specific memory location in memory 150. That memory location would have encoded in it the information to determine what size data bus is coupled to system 100. An alternative embodiment, includes pre-programming the chip hardware with the size of external bus 140. Thus, the sub-systems described below for allowing access to a 32 bit or 64 bit external memory bus 140 are aware, immediately after the chip is powered up or after a hardware reset, which size external bus 140 is currently coupled to system 100. Of course, other means for determining the size of the external bus will be apparent to those skilled in the art and in no way is the present invention limited to the techniques described above.

Figure 2:
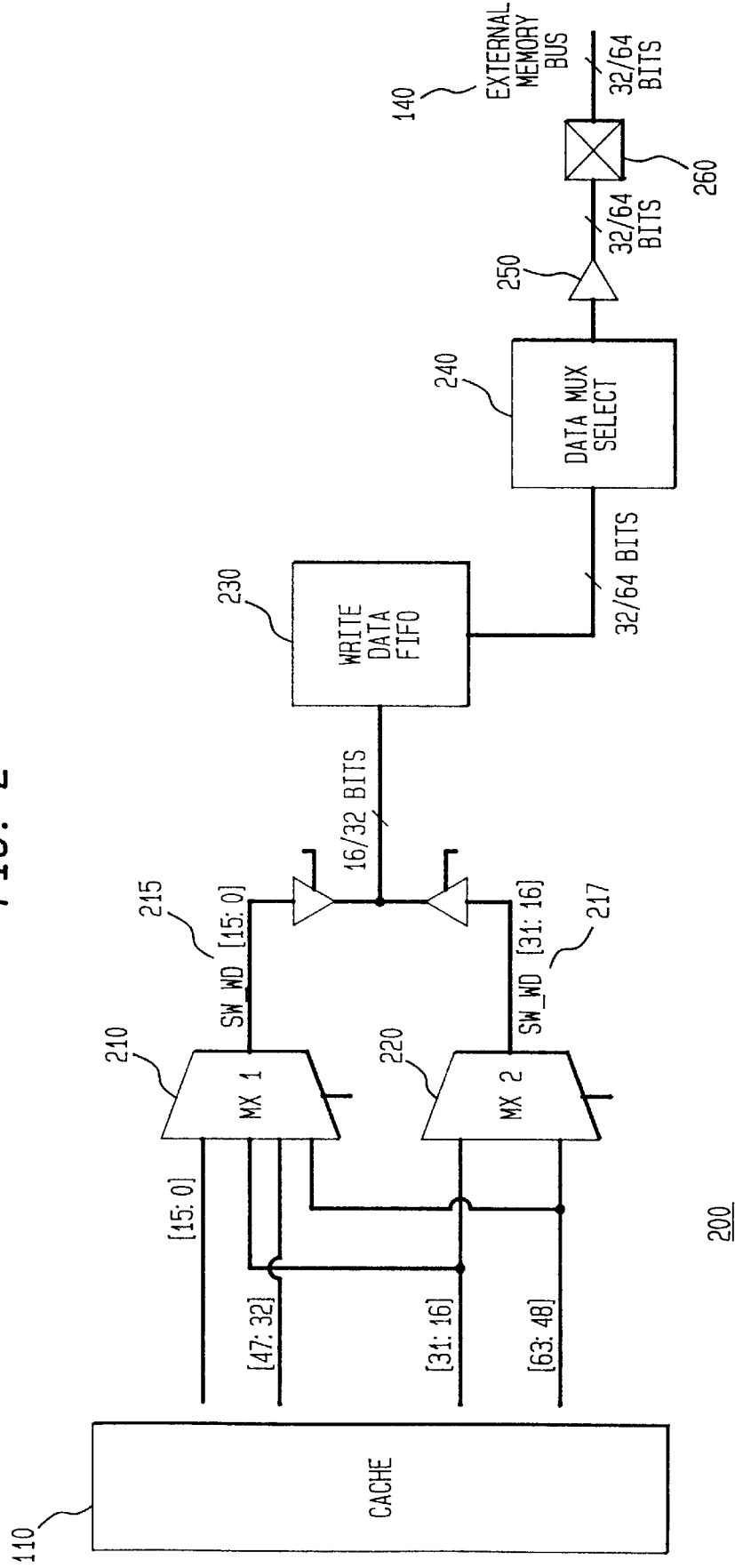
FIG. 2 is a circuit block diagram for a cache 110 write (store) to the main memory 150.
Figure 4:
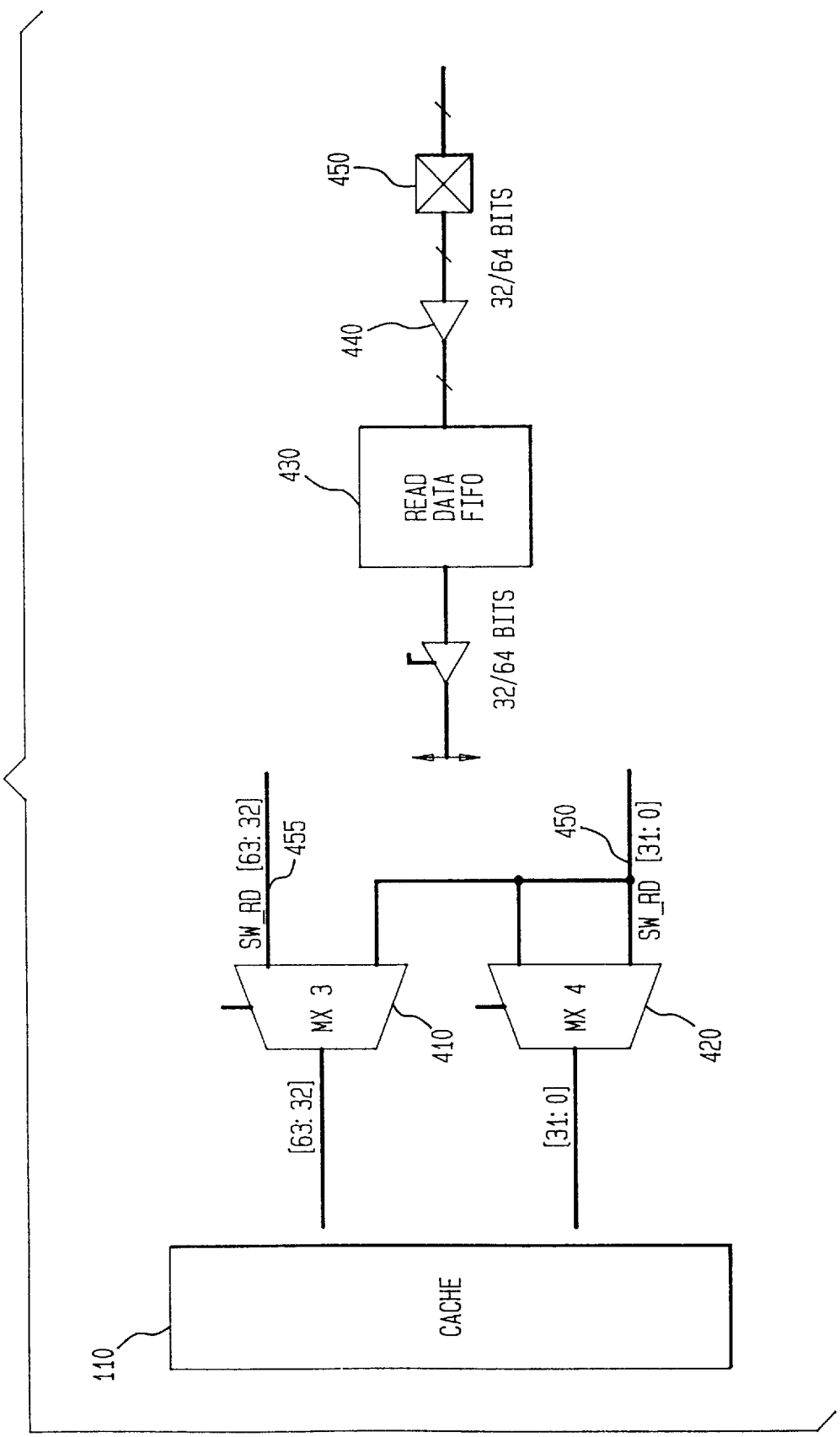
FIG. 4 is a circuit block diagram for a read (fetch) from main memory 150 to cache 110.

Referring to FIGS. 1, 2, and 4, CC_D_BUS 126(b) and SW_WD 215, are used to send write data from the master device (e.g., D_cache 115) to a write data FIFO 230 (described below and shown in FIG. 2). MC_D_BUS 126(a), SW_RD 450 and 455 are used to send the return read data from the slave device (memory port 127 or IOU 130) back to the master device. Both SW_WD and SW_RD are both tri-state buses.

II. The Dual Width Memory Subsystem

The present invention allows the system architecture described above to be interfaced with either a 32 or 64 bit external memory bus 140. In order to facilitate dual width memory transfers, the present invention is designed to use a maximum of two clock cycles to send a word between cache 110 and memory interface port 127, or vice versa. For example, if cache 110 writes one long word (64 bits), and the system 100 is coupled to a 32 bit external bus 140, it will take two clock cycles to send the data to memory interface port 127.

Referring to FIG. 2, there is a logic design 200 (hereinafter subsystem 200) for writing to main memory 150. Subsystem 200 represents the hardware necessary for either a 32 or 64 bit data transfer. Subsystem 200 transfers data in a "double pumped" fashion. For example, instead of transferring one word of data every clock cycle, the subsystem 200 can transfer one half word of data every half clock cycle. Since the buses are double-pumped, care is taken in the circuit design to ensure that there is no bus-conflict when the buses turn around and switch from one master to a new master. Double pumping reduces the number of required bit lines thereby minimizing expensive wire requirements with minimal performance degradation. Although the preferred embodiment implements a double pumping scheme, double pumping is not necessary for carrying out the present invention.

Subsystem 200 uses multiplexers 210, 220 to send data from data cache bus (CC_D_BUS) 126(b) to main memory 150. Multiplexers 210, 220 of a preferred embodiment of the present invention uses multiplexer/latches. In other words the multiplexers can temporarily store data. 16 or 32 bits (depending on whether there is a 32 or 64 bit memory bus 140, respectively) of data will be transferred to memory interface port 127 every half clock cycle and stored in a write data FIFO 230, located between memory interface port 127 and CCU 110.

Subsystem 200 also contains a buffer 250 and pad 260. Buffer 250 is a tri-state output pad buffer to drive the external memory data bus and pad 260 is used to connect subsystem 200 to main memory 150.

Figure 3A:
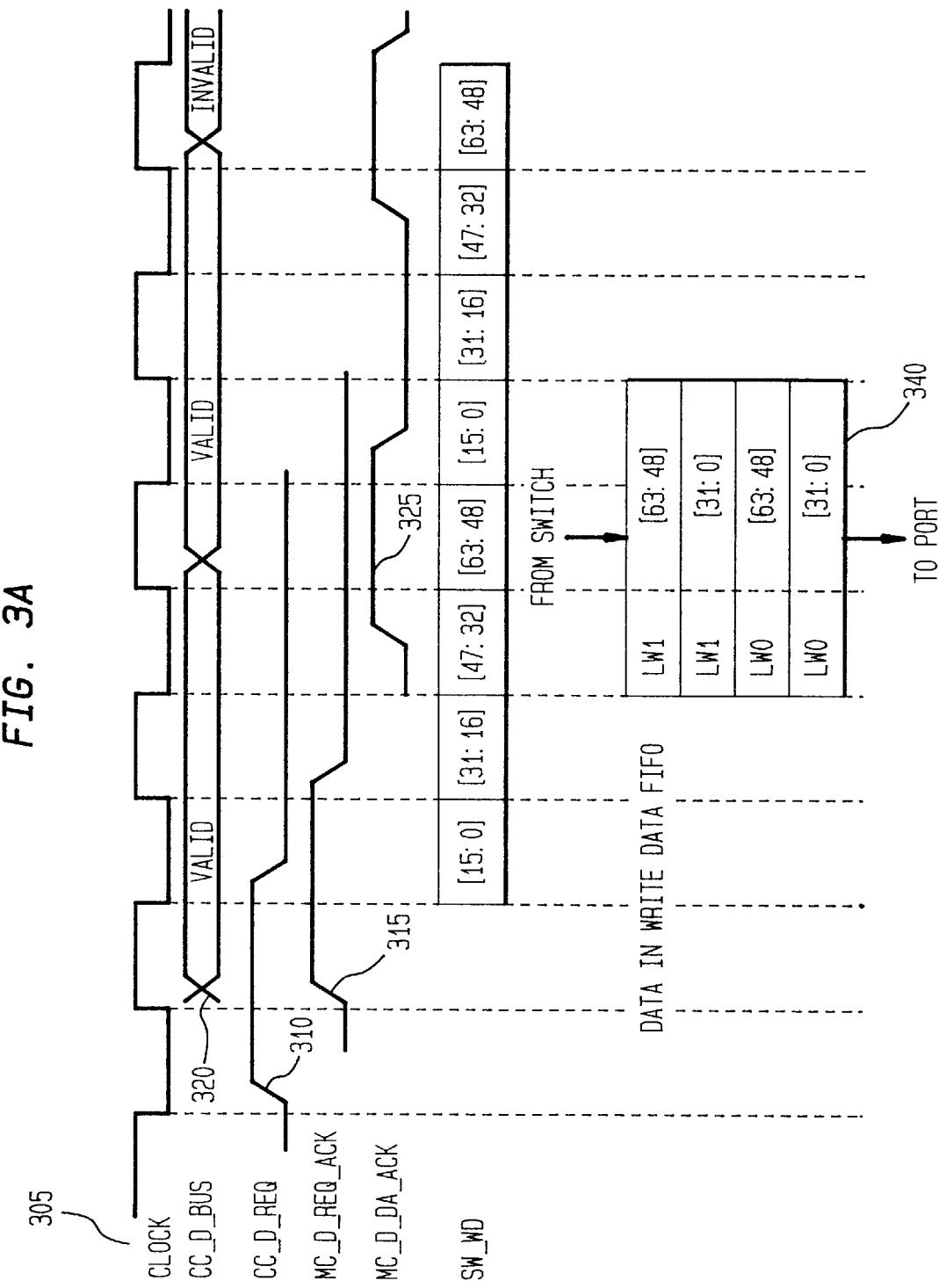

FIGS. 3(a) and 3(b) show a pair of timing diagrams for writing data to memory 150 with either a 32 bit memory bus or a 64 bit memory bus, respectively. Data can be transferred in one cycle if a 64 bit memory bus is used, while it takes two cycles to transfer data using a 32 bit memory bus.

Specifically, FIG. 3(a) shows a timing diagram for writing data to memory 150 with a 32 bit memory bus. Initially, cache 110 sends a request via the cache request signal (CC_D_REQ) 128(a) for access to memory 150, shown at reference number 310. MCU 120 acknowledges that request when MC_D_REQ_ACK goes high (at the rising edge of clock 305), as shown at reference number 315. Next, if access to memory is granted, the data to be written to memory 150 appears on the CC_D_BUS 126(b),; as shown at reference number 320. Once the data appears on the CC_D_BUS 126(b), the data is transferred to write data FIFO 230 during the next clock 305 cycles. The MC_D_DA_ACK signal indicates, as shown at reference number 325, that data is currently being received in write data FIFO 230. Every time 32 bits of data enters MCU 120 it is placed in write data FIFO 230.

The first 32 bits are sent during the first clock 305 cycle (15 bits per half clock cycle) and the second 32 bits are sent during the second clock 305 cycle. Referring to FIG. 2, initially, all 64 bits of data act as inputs into multiplexers 210 and 220. During the first clock 305 cycle, the first 32 bits are selected from multiplexers 210, 220 and saved via SW_WD 215, 217 in write data FIFO 230. During the second clock cycle, the second 32 bits are selected from multiplexers 210, 220 and saved in write data FIFO 230 via SW_WD 215, 217. Those skilled in the relevant art will readily be capable of generating the necessary control signals/logic for multiplexers 210, 220 based on the disclosed timing signals described above and the information that the system 100 is currently coupled to a 32 bit external bus. Once the data is saved in write data FIFO 230, it can be written (stored) to memory 150 whenever external data bus 140 becomes available.

Figure 6A:
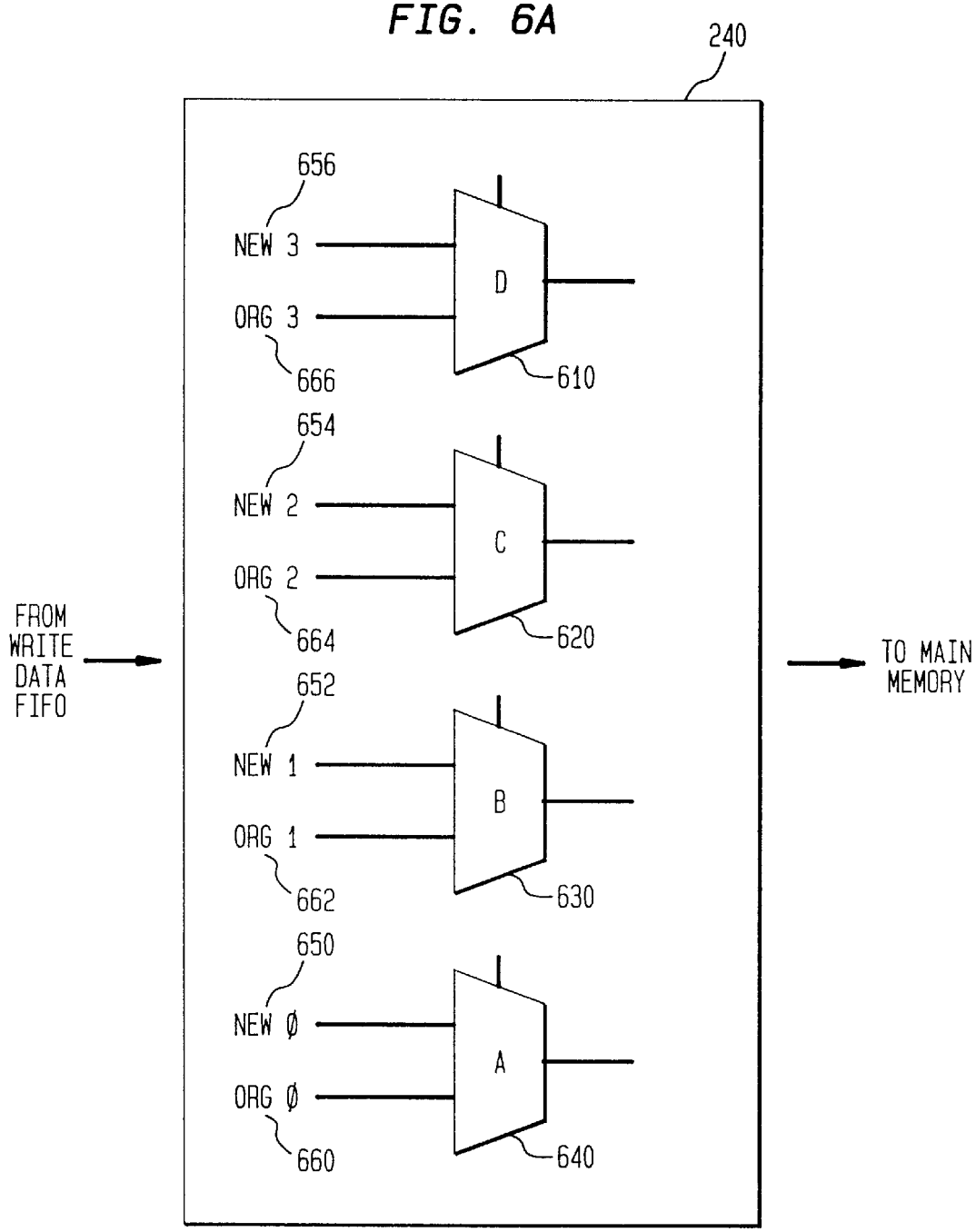
FIG. 6 is a detailed circuit diagram of the Data Multiplexer Select 240 shown in FIG. 2.
Figure 6B:
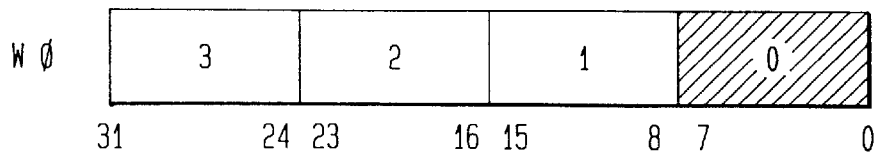

Oftentimes, not all of the data needs to be written to memory 150 (e.g., during a read-modify-write). Consequently, a data multiplexer select 240 is provided. Referring to FIG. 6(a), data multiplexer select 240 provides a scheme for selecting a set of bytes from the data being transferred from write data FIFO 230 to main memory 150. During a read-modify-write, potentially only a portion of the data is modified. For example, as shown in FIG. 6(b) only the first 8 bits of W0 have been modified (as indicated by shading). Initially, all 32 bits are placed at inputs ORG0 660 through ORG3 666 of multiplexers A 610 through D 640. The data at these inputs is the data originally read from the read portion of the read-modify-write operation. This data is modified and placed at the other inputs NEW0 650 through NEW3 656 of multiplexers A 610 through D 640. As illustrated in this example, only the first 8 bits have been modified, the remaining 24 bits of data should not be stored into memory. Thus, data line NEW0 650 is selected in multiplexer A 640 and data lines ORG1 662, ORG2 6664, and ORG3 664 are selected in multiplexers B 630, C 640, and D 650. Which has the effect of storing the data as originally read from memory except for the modified portion of the data. The structure and operation of the control logic for selecting the outputs of multiplexers A 640 through B 660 will become apparent to those skilled in the art.

Note that the data multiplexer select 240 is not essential to practice the present invention. It is only an option that has been implemented in a preferred embodiment of the present invention.

The timing diagram shown in FIG. 3(a) shows an example of two 64 bit words being written to memory 150 via a 32 bit external bus 140. A sample write data FIFO 340 is shown with four 32 bit blocks. At this point, the data is ready to be sent on external data bus 140 in 32 bit blocks from write data FIFO 340.

FIG. 3(b) shows the timing diagram for writing data to main memory 150 with a 64 bit external memory bus 140. Initially, cache 110 requests an acknowledgement from MCU 120 that it can write data to memory 150. Once again, this is accomplished by sending CC_D_REQ high at 350. MCU 120 acknowledges the request by sending MC_D_REQ_ACK high at 355, at which point the data is sent onto the CC_D_BUS 126(b). At the beginning of the next clock cycle (shown at reference number 365) 32 bits of data are transferred to write data FIFO 230 via lines SW_WD 215, 217. Once again, the MC_D_DA_ACK signal goes high to acknowledge that write data FIFO 230 is receiving the data from cache 110.

In contrast to the 32 bit memory bus timing constraints, it only takes one clock cycle to transfer the 64 bits to write data FIFO 230. 32 bits are transferred every half cycle. A sample write data FIFO 375 is shown with two 64 bit blocks. At this point, the data is ready to be driven onto external data bus 140 in 64 bit blocks.

Referring to FIG. 2, as stated above, all 64 bits of data act as inputs to multiplexers 210 and 220. When a 64 bit external data bus 140 is coupled to system 100, all 64 bits of data are selected from multiplexers 210, 220. Thus, 64 bit blocks are stored in write data FIFO 230. During the first half clock cycle the first 32 bits are placed on SW_WD 215 and during the second half clock cycle the second 32 bits are placed on SW_WD 217. Consequently, it only takes one clock cycle to transfer 64 bits from cache 110 to write data FIFO 240.

Figure 7:
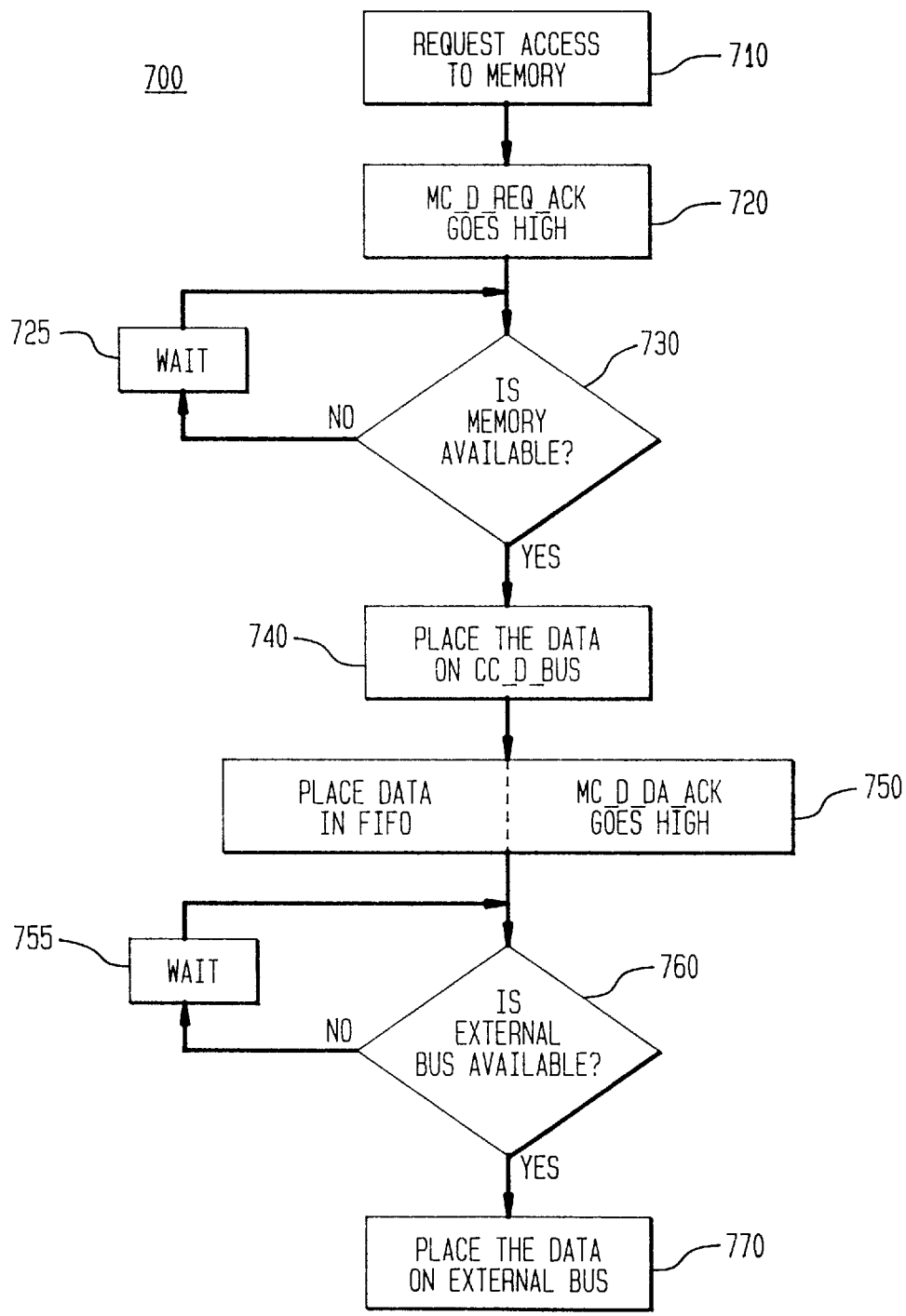
FIG. 7 is a general flowchart for writing a data stream to main memory 150.

The above procedures discussed above for writing a 32 bit or 64 bit data stream to main memory 150 via external data bus 140 is generally outlined in FIG. 7. Note that the procedure is exactly the same for both 32 and 64 bit data transfers, except step 750. If system 100 is coupled to a 32 bit external bus then the data transfer takes two cycles and if system 100 is coupled to a 64 bit external bus then the data transfer takes only one cycle. Since the 32 bit only implementation is a subset of the 64 bit implementation, the same MCU 120 control logic can be used in both. MCU 120 control is designed to change the control signals (i.e., inputs to the multiplexers) according to the width of memory bus 140. Those skilled in the art will readily be capable of generating the necessary control logic to operate the present invention given the timing and hardware configuration described above.

FIG. 4 shows the memory system for reading data (i.e., an information fetch). In a similar fashion to a write operation, cache 110 requires that data be returned back to cache 110 in 64 bit blocks. If memory port 127 returns a two long-word read request to cache 110, it will take two clock 505 cycles to send 128 bits to cache 110. The SW_RD bus 450, 455 is used to send the return read data from the slave device (memory port 127 or IOU 130) back to the master device. This bus is not double-pumped because of the timing constraints of cache 110. Data is sent only when clock 505 is high. Cache 110 requires that the data be valid at the falling edge of clock 505. Since the data is received from the port 127 when clock 505 is high, if the SW_RD bus 450, 455 was double-pumped, the earliest that cache 110 would get the data would be at the positive edge of clock 505, not at the negative edge of clock 505. Since the SW_RD bus 450, 455 is not double-pumped, this bus is only active (not tri-stated) during clock 505 and there is no problem with bus buffer conflict where two bus drivers drive the same wires at the same time.

Subsystem 400 also contains a buffer 440 and pad 450. Buffers 440 and 450 are used to translate the external pad voltages to the internal logic voltages and pad 450 is used to connect subsystem 400 to main memory 150.

FIG. 5(a) and FIG. 5(b) show the read data timing back to cache 110 for 32 bit and 64 bit bus modes, respectively. FIG. 5(a) shows the timing diagram for reading data from main memory 150 using a 32 bit external memory bus 140. Initially, 32 bits of data are transferred over external memory bus 140 and placed in read data FIFO 430 in 32 bit blocks. Next, the data is placed on data lines SW_RD as shown at reference numbers 510 and 512. When MC_D_B_VLD goes high, as shown at reference number 515, the MC_D_BUS is available. The data/instruction requested by cache 110 will subsequently appear on data bus (MC_D_BUS) 126(a)/instruction bus (MC_I_BUS) 126(c), respectively, subsequent to the beginning of the next clock 505 rising edge, as shown at reference number 520. At this point, the data is being transferred to cache 110.

Referring to FIGS. 1 and 4, when utilizing a 32 bit external bus 140 the data enters MCU 120 through port 127. The data is then stored in read data FIFO 430 in 32 bit blocks. Initially, read data FIFO 430 is empty and data lines 450, 455 are available. However, once data lines SW_RD [31:0] 450 and SW_RD[63:32] 455 become unavailable, the data remains stored in read data FIFO 430 until the data lines 450, 455 become available (only data line 450 is used in 32 bit mode).

As soon as data line 450 becomes available, the first 32 bits in read data FIFO 430 are sent to multiplexers 410, 420. Specifically, multiplexer 420 is concerned with the lower 32 bits and multiplexer 410 is concerned with the higher 32 bits. The first 32 bits are popped from read data FIFO 430 and placed at the input of multiplexer 420 via SW_RD [31:0] 450. Next, the second set of 32 bits will be popped from read data FIFO 430 and sent to multiplexer 410 via SW_RD[63:32] 455. Once all 64 bits of data are placed at the inputs of multiplexers 410, 420, all 64 bits are selected from multiplexers 410, 420, and placed on MC_D_BUS 126(a) (or MC_I_BUS 126(c) as the case may be) and read into cache 110.

An alternative embodiment of the present invention can be configured with a separate set of multiplexers, one set for the I_Cache 113 and the a second set for D_Cache 115. In addition, data line SW_RD[63:32] is optional for 32 bit (low cost) implementations.

Referring to FIG. 5(b), a timing diagram for reading data when a 64 bit external bus 140 is being utilized is shown. Initially, the data from external data bus 140 is stored in read data FIFO 430. Since a 64 bit external data bus 140 is being used, the data is stored in read data FIFO 430 is 64 bit long words. The data remains in read data FIFO 430 until data lines SW_RD 450, 455 are available. Once SW_RD 450, 455 become available, all 64 bits are transferred to the inputs of the multiplexers via SW_RD 450, 455, as shown at reference number 550. When MC_D_B_VLD goes high, as shown at 555, the data will subsequently be placed on MC_D_BUS 126(a) (or MC_I_BUS 126(c) as the case may be) during the next cycle of clock 505, as shown at reference number 560. The data is transferred over MC_D_BUS 126(a) and forwarded to requesting cache 110.

Referring again to FIG. 4, after the data enters read data FIFO 430 and data lines 450, 455 are available, all 64 bits of data are placed at the inputs of multiplexers 410, 420. The lower 32 bits are placed at the input to multiplexer 420 via data line SW_RD[31:0] 450. The upper 32 bits are placed at the input to multiplexer 410 via data line SW_RD[63:32] 455. After all 64 bits have been placed on data lines SW_RD[31:0] 450 and SW_RD[63:32] 455, the data is selected from multiplexers 410, 420 and forwarded to cache 110.

Figure 8:
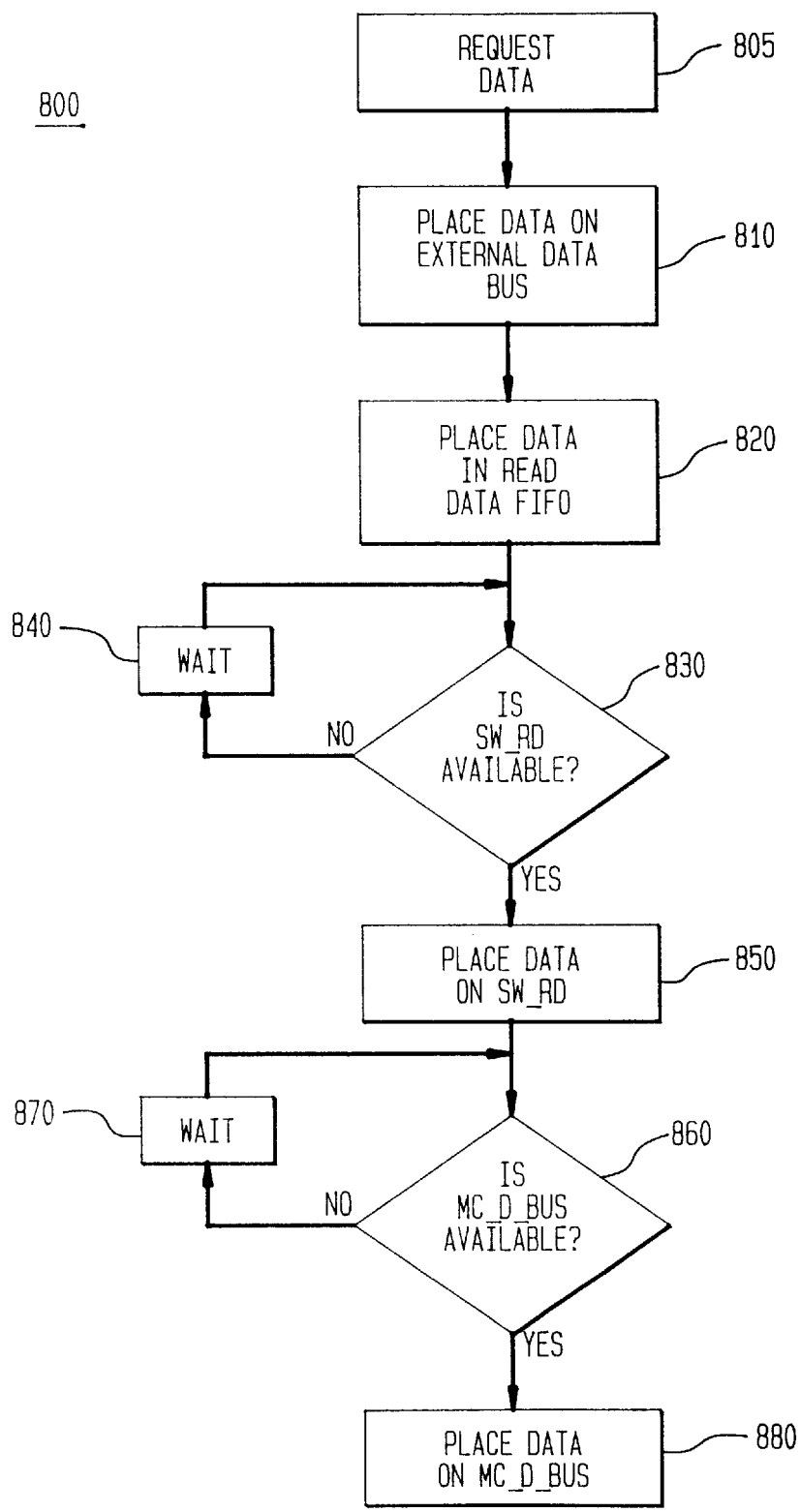
FIG. 8 is a general flowchart for reading a data stream from main memory 150.

The procedures discussed above for reading a 32 bit or 64 bit data stream from main memory 150 via external data bus 140 is generally outlined in FIG. 8. Once again note that the procedure is exactly the same for both 32 and 64 bit data transfers, except steps 850, 860, and 870. If system 100 is coupled to a 32 bit external bus then the data transfer takes two cycles per long word (64 bits) and if system 100 is coupled to a 64 bit external bus then the data transfer takes only one cycle per long word. Those skilled in the art will readily be in a position to generate the necessary control logic to operate the present invention given the timing and hardware configuration described above.

Data is put into read data FIFO 430 when the switch read bus (SW_RD) is not available. Data is always put in write data FIFO 230 and read out according to memory timing requirements. If external bus 140 or SW_RD buses are currently being used by some other port, the oncoming write or read data is temporarily pushed into write data FIFO 230 or read data FIFO 430, respectively. When the requested bus becomes available (i.e., external bus 140 or SW_RD is released), data is popped from the particular FIFO and transferred to either memory 150, or requesting cache 110 or IOU 130. On the other hand, if the requested bus is available when the data arrives in the write data FIFO 230 or read data FIFO 430, then the data is immediately transferred through the respective FIFO onto the data lines.

The memory system is designed to allow a 64 bit data path to operate in either 64 or 32 bit mode. Software can select which system configuration is used. The 32 bit mode control operation for both 64 and 32 bit chips is the same. Essentially, the control logic and the data path is similar to when the system is configured to connect to a 32 bit external bus and run in 32 bit mode. However, when a 32 bit external bus is used the upper bits of the switch 125 and the write data FIFO 230 or read data FIFO 430 are not used (i.e., SW_WD [31:16] and SW_RD[63:32] will be "don't care"). But as discussed above, the control logic remains the same.

To fully appreciate the design of the present invention the write data FIFO 230 and read data FIFO 430 must be able to store at least two sets of data at any given time, where a set of data is equal to the maximum block of data that is to be transferred. This ensures that when external bus 140 has been accessed on the first set of data is being placed onto external bus 140, a second set of data is immediately available to be put on external bus 140. Thus, there is no guaranteed lag time between the first set of data being placed on external bus 140 and the second set of data being place on external bus 140.

In addition, the present invention is directly scalable (e.g. 64/128 bits). Consequently, one skilled in the art can readily design a system that provides for dual width memory bandwidth with a variety of bit transfer combinations. In addition, the present invention contemplates a multiple width memory bus. Thus, it is contemplated that one skilled in the art could readily design a system, utilizing the teachings of the present invention described above, that is configured to handle, for example, a 32 bit, 64 bit, and/or 128 bit external data buses. Thus, there are infinite combinations of external data bus widths that could be implemented into one system with the teachings of the present invention.

It is contemplated that one skilled in the art can apply the teachings of the present invention to any type of bus in a computer-based system. For example, the present invention is applicable to dual width I/O buses. Furthermore, the present invention is not limited to external buses, but can be applied to internal buses as well.

While the invention has been particularly shown and described with reference to preferred embodiments thereof, it will be understood by those skilled in the art that various changes in form and details may be made therein without departing from the spirit and scope of the invention.

What is claimed is:

1. A memory interface unit for providing the interface between one or more bus requesters and a bus, wherein the bus provides a communication path between the one or more bus requesters and a memory in a computer-based system, wherein the one or more bus requesters operate on data words having a first width measured in bytes, and wherein the bus has a second width measured in bytes equal to or less than the first width, wherein said memory interface unit comprises:

a bus width detector configured to detect and indicate the second width;

a buffer memory, coupled to the bus, configured to store data with a maximum width equal to the first width; and a switch network, coupled between the one or more bus requesters and said buffer memory and further coupled to receive said second width from said bus width detector, said switch network configured to transfer data from the one or more bus requesters to said buffer memory in units equal to said second width, said switch network further configured to transfer data from said buffer memory to the one or more bus requesters in units equal to said first width.

2. The memory interface unit of claim 1, wherein one of said bus requesters is a cache memory.

3. The memory interface unit of claim 2, wherein said cache memory comprises a data. cache and an instruction cache.

4. The memory interface unit of claim 1, wherein one of said bus requesters is an I/O device.

5. The memory interface unit of claim 1, wherein the memory interface unit operates in a multiprocessor environment.

6. The memory interface unit of claim 1, wherein said switch network comprises a plurality of multiplexers.

7. The memory interface unit of claim 1, wherein said switch network is configured to transfer data from the one or more bus requesters to said buffer memory in double-pumped fashion.

8. The memory interface unit of claim 1, wherein the first width is equal to $2^n$ bytes and the second width is equal to $2^m$ bytes, wherein m is less than or equal to n, and wherein said switch network transfers data between the one or more bus requestors and said buffer memory in at most $2^{n-m}$ clock cycles.

9. The memory interface unit of claim 1, wherein said buffer memory is configured to store at least two units of data having a width equal to the first width.

10. A computer system comprising:

one or more bus requestors which operate on data words having a first width measured in bytes;

a main memory;

an external bus, coupled to said main memory, having a second width measured in bytes equal to or less than said first width; and a memory interface unit, coupled between said one or more bus requestors and said external bus, said memory interface unit including:

a bus width detector configured to detect and indicate said second width, a buffer memory, coupled to said external bus, configured to store data with a maximum width equal to said first width, and a switch network, coupled between said one or more bus requestors and said buffer memory and further coupled to receive said second width from said bus width detector, said switch network configured to transfer data from said one or more bus requestors to said buffer memory in units equal to said second width, said switch network further configured to transfer data from said buffer memory to said one or more bus requestors in units equal to said first width.

11. The computer system of claim 10, wherein one of said bus requestors is a cache memory.

12. The computer system of claim 11, wherein said cache memory comprises an instruction cache and a data cache.

13. The computer system of claim 10, wherein said main memory is interleaved.

14. The computer system of claim 10, wherein one of said bus requestors is an I/O device.

15. A computer system comprising:

one or more bus requestors which operate on data words having a first data width;

a main memory, configured to store data having a second data width equal to or less than said first data width;

an external bus, having said second data width and configured to transfer said data between said one or more bus requestors and said main memory; and a memory interface unit, including:

a bus width detector configured to detect and indicate said second data width, a buffer memory that stores said data transferred via said external bus, wherein said data has a maximum width equal to said first data width, and a switch network, responsive to said bus width detector, that transfers said data from said one or more bus requestors to said buffer memory in units equal to one of said second data width or said first data width based on an indication from said bus width detector.

16. A method for transferring data from a master device to a slave device via a bus, wherein the master device operates on data having a first data width and the bus has a second data width equal to or less than the first width, the method comprising the steps of:

requesting access to the bus by the master device;

transferring data having a first data width from the master device to a pair of multiplexers, wherein said multiplexers can temporarily store data;

transferring said data to a first-in-first-out (FIFO) data buffer, wherein said data is selected for transfer to said FIFO data buffer from said pair of multiplexers in blocks of the first data width if the second data width is equal to the first data and said data is transferred in blocks of said second data width if the second data width is less than the first data width; and transferring said data from said FIFO data buffer to the bus in blocks equal to the first data width if the second data width is equal to the first data width and said data is transferred in blocks of said second data width if the second data width is less than the first data width.

17. A method for a master device to read data from a slave device via a bus, wherein the master device operates on data words having a first data width and the bus has a second data width equal to or less than the first width, the method comprising the steps of:

requesting access to the bus by the master device;

transferring data from the bus to a first-in-first-out (FIO) data buffer, wherein said data is transferred to said FIFO data buffer from the bus in blocks equal to the second data width;

transferring said data from said FIFO data buffer to a pair of multiplexers in blocks equal to the second data width, wherein said pair of multiplexers are capable of temporarily storing said data, said step of transferring said data from said FIFO data buffer continues until a block of data equal to the first data width has been transferred to said pair of multiplexers; and transferring said data from said pair of multiplexers to the master device in a block equal to the first data width.

* * * * *